UNITED STATES PATENT OFFICE.

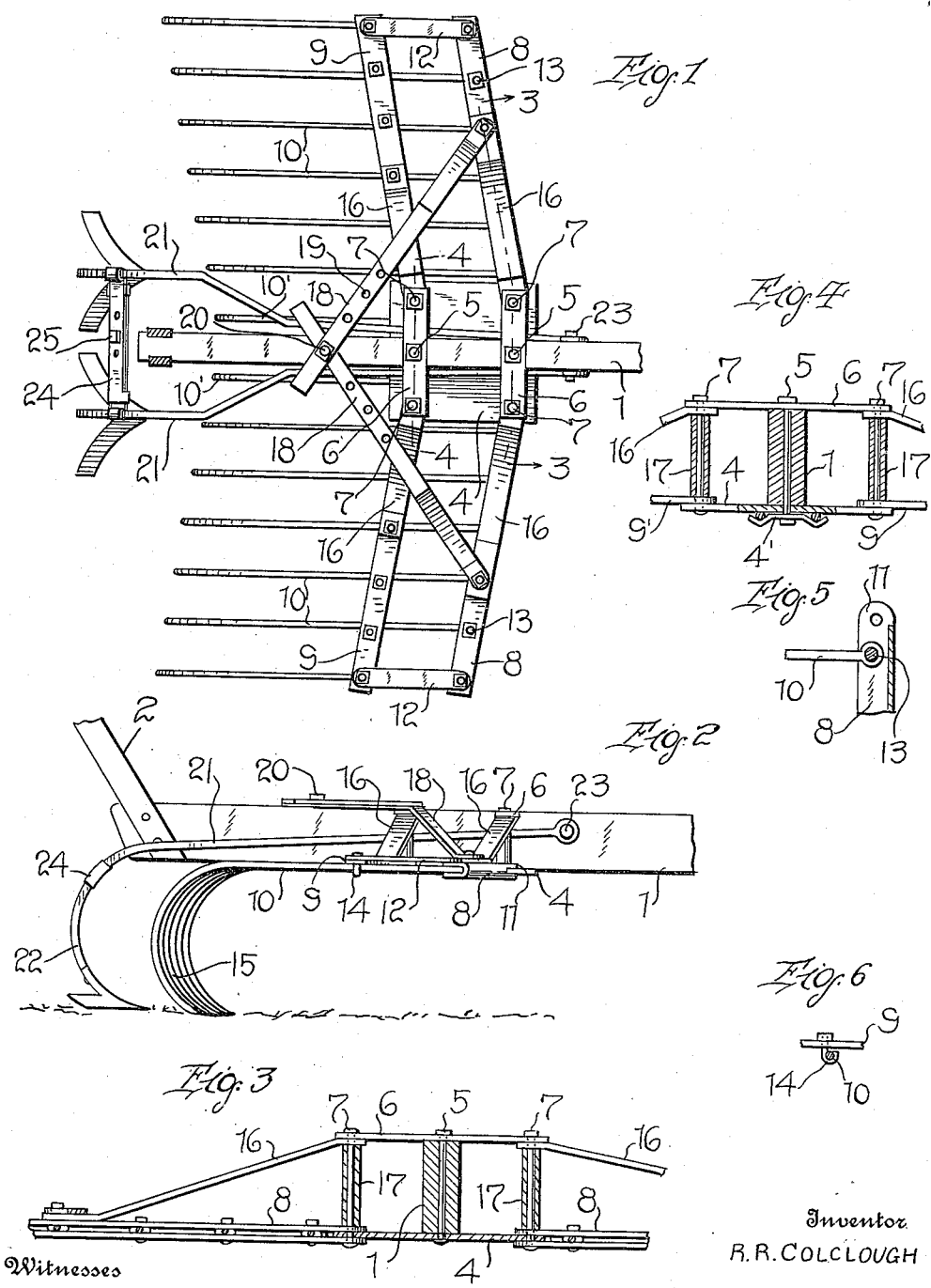

ROBERT R. COLCLOUGH, OF MAXEYS, GEORGIA.

CULTIVATOR.

1,158,788. Specification of Letters Patent. Patented Nov. 2, 1915.

Application filed November 5, 1913. Serial No. 799,350.

*To all whom it may concern:*

Be it known that I, ROBERT R. COLCLOUGH, a citizen of the United States, residing at Maxeys, in the county of Oglethorpe and State of Georgia, have invented certain new and useful Improvements in Cultivators, of which the following is a specification, reference being had to the accompanying drawings.

This invention relates to new and useful improvements in cultivators and more particularly to cultivators designed with spring teeth, the object of the invention being to provide a cultivator whereby the sets of teeth may be disposed at various angles relatively to each other and are to be preferably constructed of round metal instead of flat metal.

Another object of the invention is the provision of a cultivator of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a top plan view; Fig. 2 is a side elevation; Fig. 3 is a sectional view taken on the line 3—3 of Fig. 1; Fig. 4 is a sectional view taken on the line 4—4 of Fig. 1; Fig. 5 is a detail section taken through one of the securing bars illustrating the manner of retaining the spring teeth in position; and Fig. 6 is a detail view illustrating the manner of supporting the teeth from the rear set of bars.

Referring more particularly to the drawings, 1 indicates the center beam to which is secured the handle members 2 whereby the same may be readily guided. Arranged upon the under face of the beam adjacent the rear end thereof is a plate 4 which is substantially rectangular in form and is secured to the beam by means of the bolts 5 which extend upwardly through the beam and secure the transverse elongated plates 6 to the top face of the beam. The plates 6 are arranged in spaced relation and are preferably disposed above the lower plate 4 at a point adjacent each end thereof.

Pivoted bolts 7 are provided, the lower ends of which are mounted within each corner of the plate 4, while the upper ends thereof are mounted within the ends of the transverse plates 6. Pivotally mounted at their inner ends upon the bolts 7 are the normally disposed parallel bars 8 and 9. The transverse bars 8 and 9 are arranged upon opposite sides of the beam 1 and are adapted to support the cultivator teeth 10. The bars 8 are arranged upon opposite sides of the center beam 1 are preferably channel form in cross section and are provided at one end with the spaced ears 11 which are arranged upon opposite sides of the bottom plate 4 and pivotally secured by means of the bolts 7. The outer ends of the bars 8 and 9 are securely held in parallel spaced relation by means of the pivoted brace members 12, the ends of which are loosely connected to each of the bars to retain them in their operative position.

In securing the cultivator teeth 10 in position, I prefer to have their inner ends looped and mounted upon the transverse pins 13 which extend entirely through the channel bars 8. The medial portions of the teeth 10 are supported by means of the eyes 14 which are pivotally mounted in the bars 9 so that when the bars 8 and 9 are adjusted relative to the center beam 1, the cultivator teeth 10 will also be adjusted simultaneously. It will be noted that the outer ends of the teeth 10 are curved, as shown at 15, so that they will readily engage within the ground and it will be understood that the curvature of the teeth may be greater or less than the illustration. The bars 8 and 9 are to be securely held in position by means of the brace members 16, the inner ends of which are pivotally mounted upon the bolts 7 and arranged beneath the ends of the transverse plates 6, the outer ends of said brace members being pivotally secured to the longitudinal bars 8 and 9.

Sleeves 17 are rotatably mounted upon the pivoted bolts 7 and adapted to be arranged between the ends of the bars 8 and 9 and the inner ends of the brace members 16 so that the ends of the aforesaid bars will be securely retained in position and at the same time will be permitted to move freely when desired. In order to retain the bars 8 and 9 in various adjusted positions, I provide the adjustable bars 18, the outer ends of which are pivotally connected with the bars 8 while the inner ends thereof are provided with a plurality of openings 19 adapted to receive the removable bolt 20 which is carried by the center beam 1 so that the bars 8 and 9 may be moved to various angular positions with respect to the center beam and securely retained in such position. From this it will be seen that the teeth arranged upon opposite sides of the center beam may be quickly and readily disposed in various desired positions and retained in such position by the adjustment of the bars 18.

In connection with my improved cultivator, I provide a pair of plow points or sweeps which are supported upon the rear ends of the spaced rods 21, the lower ends of which are curved, as shown at 22, the front ends of said rods being arranged along side the center beam 1 and secured by means of a transverse bolt 23 at a point beyond the inner edge of the plate 4. The rods 21 are securely retained in spaced relation by means of the adjustable plates 24, one end of each of said plates being secured to the rods 21 and the other ends adjustably connected and secured in an adjusted position by means of the transverse pin 25. From this it will be apparent that the two plow points 26 may be arranged in spaced relation and retained in such position by the adjustment of the plates 24.

From the above description taken in connection with the accompanying drawings, it will be apparent that I have provided a simple and durable plow wherein I prefer to have the teeth thereof constructed of suitable size rods of any form of circular metal instead of flat metal teeth. The device is also constructed so that the teeth may be adjusted to various angular positions with respect to the center beam and it will be seen from the drawings that the device is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

It will be noted from the illustration in the drawings that I provide two stationary teeth 10' which are arranged upon opposite sides of the center beam 1, the front ends thereof being held in position by means of the transverse plate 4', the ends of which are bent upon themselves to engage over the inner ends of the teeth, as illustrated in cross section in Fig. 4. By providing the two central cultivator members 10' which are clamped upon the under side of the plate 4 by means of the members 4', it will be understood that when it is desired to cultivate upon opposite sides of a plant row, these two cultivating teeth are removed and the two series of teeth on opposite sides of the center of the machine properly adjusted in the manner above stated.

What I claim is:—

1. In a cultivator, the combination of a beam, a plate disposed against the under side of said beam, bolts extending vertically through the beam and through said plate to secure the latter in position, a pair of cultivating teeth, clamping devices on the lower ends of said bolts to engage said teeth and removably clamp the same against the under side of said plate, and two series of cultivating teeth arranged upon opposite sides of said removable teeth and adjustably supported by said plate.

2. In a cultivator, the combination of a beam, a plate arranged upon the under side of said beam, spaced cultivator teeth, means for removably clamping said teeth upon said plate and also securing the plate in position against the under side of the beam, bars pivotally mounted upon said plate and projecting from opposite sides thereof, and two series of cultivator teeth carried by the respective bars to be adjustably disposed with respect to said first named teeth.

3. In a cultivator, the combination of a beam, a plate arranged upon the under side of said beam, transverse plates extending across the top of the beam, vertical bolts connecting said plates and holding the same against relative movement, additional bolts extending through said plates and the beam, a central pair of cultivator teeth, clamping members on the lower ends of the latter bolts to removably clamp said teeth against the under side of the first named plate, spaced parallel bars pivotally mounted upon said first named bolts, a series of cultivator teeth carried by each of said bars, and means for adjusting said parallel bars to position the teeth carried thereby with respect to said central cultivator teeth.

4. In a cultivator, a beam, plates fixedly secured upon the upper and lower faces of said beam and projecting beyond opposite sides thereof, a series of cultivator teeth arranged upon each side of the beam and having supporting bars mounted between said plates for swinging movement, and plows disposed rearwardly of the respective series of cultivator teeth and having rods disposed upon relatively opposite sides of the beam and extending between the upper and lower plates on said beam, said rods at their forward ends being mounted upon the beam in advance of said plates, said upper and lower plates limiting the vertical movement of the plows with respect to the beam.

In testimony whereof I hereunto affix my signature in the presence of two witnesses.

ROBERT R. COLCLOUGH.

Witnesses:
S. E. WRAY,
W. O. DURHAM.

Copies of this patent may be obtained for five cents each, by addressing the "Commissioner of Patents, Washington, D. C."